Patented Feb. 5, 1924.

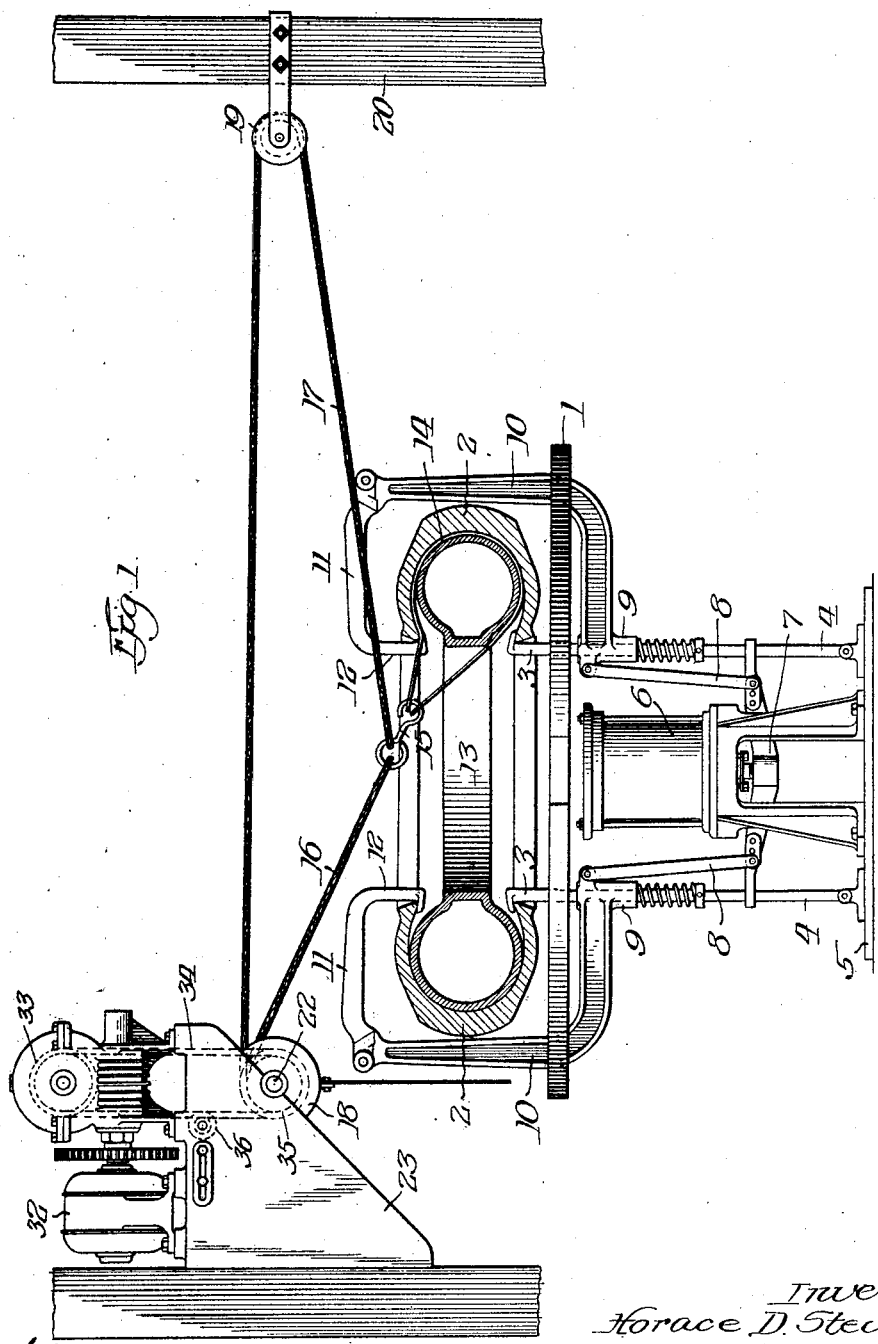

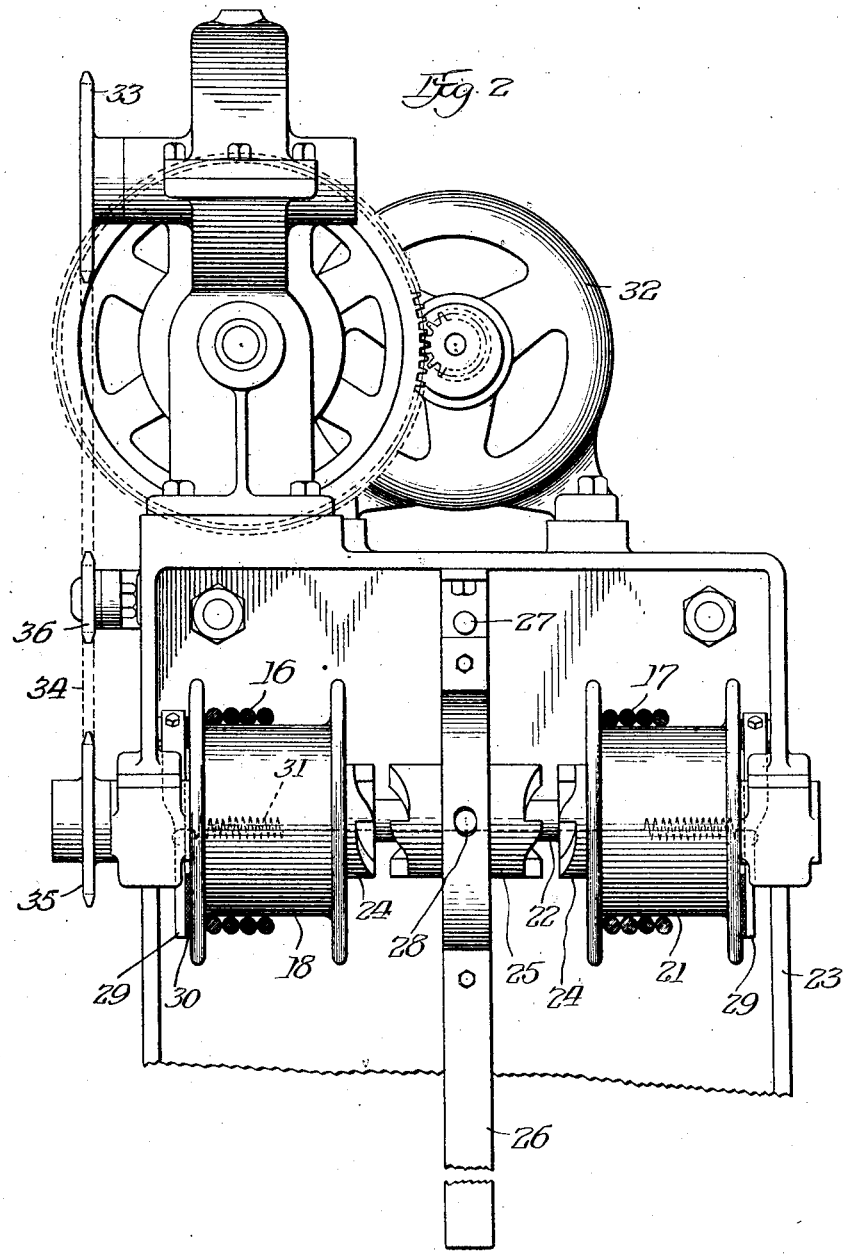

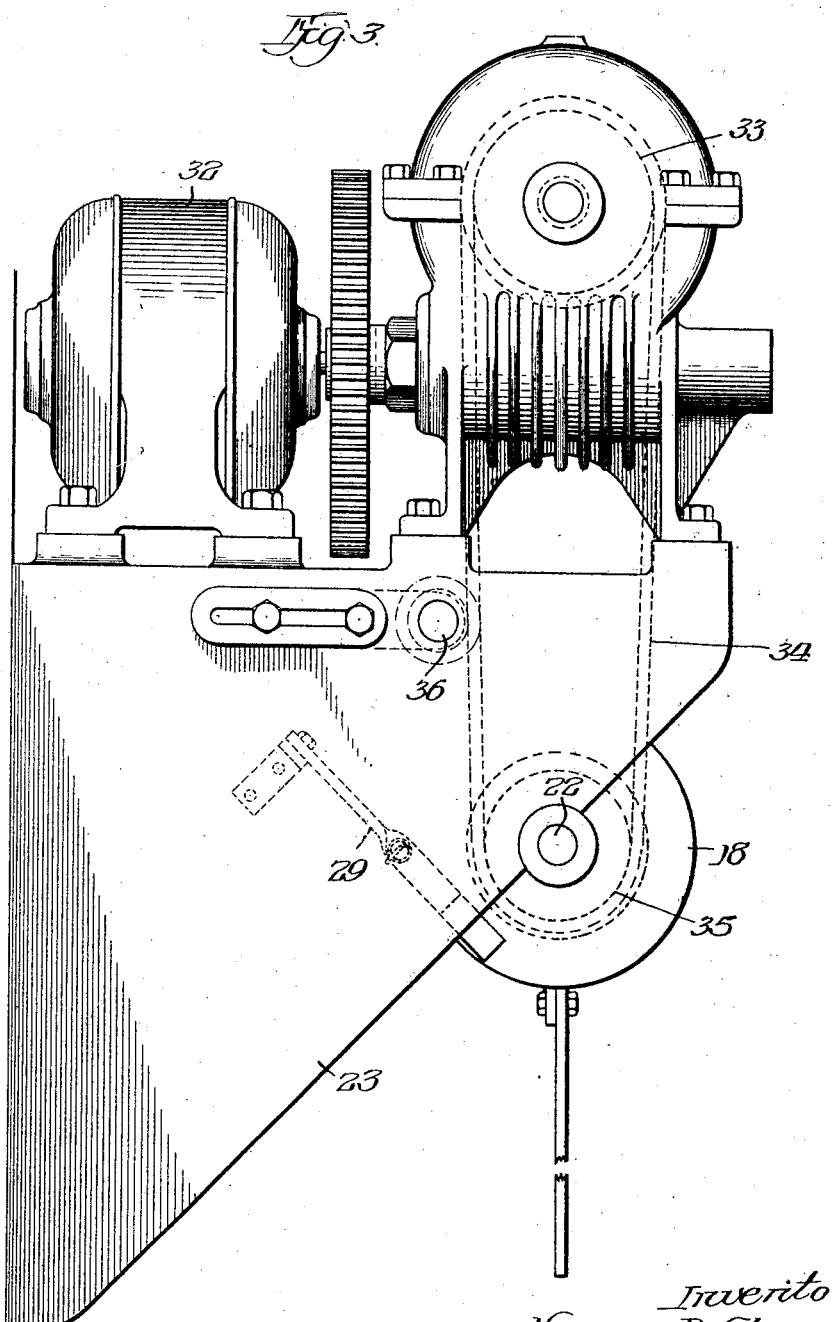

1,482,446

UNITED STATES PATENT OFFICE.

HORACE D. STEVENS, OF AKRON, OHIO, ASSIGNOR TO THE FIRESTONE TIRE & RUBBER COMPANY, OF AKRON, OHIO, A CORPORATION OF OHIO.

APPARATUS FOR HANDLING AIR BAGS IN THE MANUFACTURE OF TIRES.

Application filed July 30, 1921. Serial No. 488,699.

*To all whom it may concern:*

Be it known that I, HORACE D. STEVENS, a citizen of the United States, residing at Akron, in the county of Summit, State of Ohio, have invented certain new and useful Improvements in Apparatus for Handling Air Bags in the Manufacture of Tires, of which the following is a specification.

This invention relates to the art of tire manufacture and is particularly directed to an apparatus for facilitating certain operations in the handling of tires during the construction thereof, enabling hand work to be replaced by machine.

In the process of manufacturing tires of a certain type and by certain well known operations, it is customary to use an expansible core or "air bag" as it is termed, which is expanded by internal fluid pressure, air, water or steam, the tire with the core being placed in the heater. These air bags are usually constructed of a plurality of layers of fabric and rubber and are quite heavy and difficult to handle. To place the bag within the tire and to remove it therefrom, the bag has to be bent out of its true circular state in order to enable it to pass within the tire cavity, and the same operation of course, has to be repeated in removing the bag from the tire after it has been cured. In order to bend or break the heavy bags, considerable manual labor has to be used, the work increasing with the size of the tire, and the bags stick to the inside of the tire casing after the curing operation, which adds to the labor of removing them. The bags are hot after the curing and are hard to handle. The breaking was formerly done by the workmen who handle the bag roughly and the early failure and short lives of the air bags are largely due to the extreme abuse to which the air bags are subjected.

With these difficulties and objectionable features in mind, the object of this invention is to produce an apparatus which will enable the expansible cores to be extracted from the tire casings by apparatus which will relieve the workman of the extreme labor heretofore necessary in the operation referred to and will save to a large measure, the abuse of the air bags.

As one of the elements of the improved apparatus I intend to use a machine which will hold the beads of the bag separated, while the bag is engaged by the pulling devices and to combine with this device an apparatus which will grapple the bag and pull it out of the tire.

In the drawings, there is shown one form of my invention, it being understood that modifications and variations may be made without departing from the spirit of the invention or sacrificing any of its benefits.

In the drawings:—

Fig. 1 is an elevation of the apparatus, the tire being in section, to illustrate the manner in which the bag is grappled.

Fig. 2 is a view looking at the winding drums.

Fig. 3 is a view at right angles to Fig. 2.

The tire opening machine is shown in Fig. 1 in which 1 represents a table or platform upon which the tire 2 is placed. The lower bead of the tire is engaged by a plurality of hooks 3 formed in the upper ends of pivoted arms 4, supported on the base 5. On the base 5 is located an air cylinder 6, the piston of which is connected to a cross-head 7. The cross-head is connected by links 8 to sleeves 9, slidably carried on the arms 4. Angular or L-shaped arms 10 are formed on the sleeves 9 and extend around the tire, passing through the platform 1. On the upper ends of the arms are carried pivoted hooks 11, the downwardly curved ends of which are indicated by the numeral 12 engaging the upper bead. When the air cylinder is operated the tire will be opened up in the manner familiar in the art, and as shown in Fig. 1.

The air bag or expansible core is shown at 13, this bag being usually formed of a plurality of layers of rubber and fabric vulcanized together to form a continuous annular chamber, within which the expanding fluid is admitted the bag being placed in the tire before the latter is put in the mold and remaining with the tire during the curing operation.

When the tire is removed from the mold after vulcanization, it is placed on the platform and the beads are engaged by the hooks 3 and 12, the latter hooks being lowered as is understood. The cross-head 7 is then lifted and the tire is expanded and held in expanded position. The workman then loosens the air bag from the tire at one point and passes a grapple of some preferred form around the bag at this point.

A convenient form of grapple is shown in Fig. 1 comprising a loop or sling 14 which is carried by a hook 15. The hook 15 has attached to it two pulling devices such as ropes 16 and 17. The ropes extend from the hook in opposite directions,—that numbered 16 going directly to a pulley or drum 18 and that numbered 17 passing over a sheave 19 secured at some convenient point, such as post 20 to a second drum 21, beside the drum 18.

While not essential to the invention, for the sake of economy and ease of operation, the drums 18 and 21 are mounted for rotation on a single shaft 22. This shaft is carried in brackets 23 supported above the tire opening device.

The drums 18 and 21 are provided with facing clutch members 24, between which on the shaft 24 is splined a sliding clutch member 25 adapted to mate with either of the clutch faces 24 to exert a winding action on the drums 18 and 21, the member 25 being moved in either direction by a lever 26. The lever is pivoted to the bracket 23 between the two pulleys or drums at 27, and is connected by a pin and slot 28 arranged in any suitable manner to permit the rotation of the member 25.

At the sides of the drums are located spring arms 29, the lower ends of which are provided with friction linings 30, which bear against the sides of the drums, a coil spring 31 connecting the arms so as to exert a yielding pressure against the sides of the drum. The object of this arrangement is to prevent the ropes 16 and 17 from unwinding by the weight or the tendency of the air bag to re-assume its circular form.

On the top of the bracket 23, is mounted a motor 32, which, through suitable reduction gearing, drives a sprocket wheel 33. A sprocket chain 34 passes over wheel 33 and over a gear 35 secured to the end of the shaft 22, the chain being tightened by an adjustable idler 36.

The operation of the apparatus will be readily understood from the foregoing description. The tire, as it comes from the vulcanizer is placed on the table 1 and the hooks 3 and 12 are moved into position to engage the upper and lower beads. The cross-head 7 is then moved upwardly, opening and holding the tire in the manner shown in Fig. 1. The air bag or expansible core is then loosened from the casing at one point and the grapple or sling 14 is passed about the bag and secured to the hook 15. The clutch 25 which has been in intermediate position is now shifted to engage with the drum 18 and the rope 16 is drawn to the left of Fig. 1, until the right hand portion of the bag is withdrawn from the casing, the rope 17 unwinding from the drum 21, against the action of the brake 29. The clutch is now shifted and the drum 21 rotated to draw the bag to the right of Fig. 1, which straightens out the bag and pulls it away from the tire at the left, the rope 16 unwinding to permit the bag to be withdrawn. This action will completely remove the bag from the core.

It will be seen that there is provided an efficient and easily operated device for performing the difficult task of removing the air bag from the tire. The operator is relieved of the strain of pulling the core away from the adhesive inner surface of the tire and the core or bag is bent out of its true circular shape for only the short time required to bring it out from the beads, whereupon it is immediately restored to its true circular form by the action of the rope 17. The air bag is then handled more gently than has been possible in the hand operation and failures of bags due to the bending thereof are minimized.

I believe that I am the first to provide an apparatus for removing air bags from pneumatic tires and as such am entitled to a broad range of equivalents in the construction of the appended claims. Nor is the apparatus confined to the removal of the curing bags, but may be extended to other operations should it be found to be adaptable for them. Heavy inner tubes may be removed in the same manner.

Claims:

1. In an apparatus for removing air bags from tire casings, the combination of means for holding the tire open, of means for engaging a bag, and removing it from the tire.

2. In an apparatus for removing air bags from tires, the combination of devices for separating the beads of the tire, an air bag engaging means and means connected with the air bag engaging means for drawing the bag out of the tire.

3. In an apparatus for removing air bags from tires, the combination of bead engaging members separable to hold the tire casing open, a grapple to engage the bag and means to pull the grapple in two directions.

4. In an apparatus of the character described, the combination of bead separating device, a grapple adapted to pass around the air bag at one point, means for pulling the grapple in one direction to disengage a portion of the bag from the tire and then in another direction to pull the bag out of the tire.

5. In an apparatus of the character described, the combination of means for supporting a tire casing having an air bag therein, a device for engaging the air bag and means for moving said device to pull the bag from the tire.

6. In an apparatus for removing air bags from tire casings, means for supporting the casing, a grappling device for engaging the air bag, two pulling members attached to the grapple and means for operating said pulling members to draw the grapple in one direction and then in the opposite direction.

7. In an apparatus for removing air bags from tire casings, means for supporting the casing, a grappling device for engaging the air bag, two ropes attached to said grappling device, two drums to which said ropes are attached and means for rotating said drums.

8. In an apparatus for removing air bags from tire casings, means for supporting the casing, a grappling device for engaging the air bag, rope attached to said grappling device and means for pulling the rope to break the bag away from the tire.

9. In an apparatus for removing air bags from tire casings, means for supporting the casing, a grappling device for engaging the air bag, two ropes attached to said grappling device, means for pulling one of said ropes to disengage a portion of the bag from the tire and means for pulling the other rope to disengage the remainder of the bag from the tire.

10. In an apparatus of the character set forth, the combination of means for separating the beads of a tire having an air bag therein, a device for engaging an air bag, two drums, ropes passing from said drums to the air bag engaging device and means for rotating said drums in alternation.

11. In an apparatus for removing air bags from tires, the combination of means for separating the beads of a tire having an air bag therein, a device for removable attachment to the air bag, ropes attached to said device and means for pulling on said ropes in sequence.

12. In an apparatus for removing a bag from tires, the combination of means for separating the beads of a tire having an air bag therein, a device for encircling an air bag, ropes attached to said device, and means for pulling said ropes in alternation and in opposite directions.

13. A machine for removing air bags from tire casings, having in combination, a support for the casing, means on the support to separate the beads of the tire, a driven shaft, two winding drums on said shaft, a clutch between said drums and movable into driving engagement with either drum, ropes about said drums, an air bag grapple, the rope from one drum passing directly to the grapple and a pulley, the rope from the other drum passing over said pulley and then to the grapple.

14. A machine for removing air bags from tire casings, having in combination, a support for the casing, means on the support to separate the beads of the tire, a driven shaft, two winding drums on said shaft, a clutch between said drums and movable into driving engagement with either drum, ropes about said drums, an air bag grapple, the rope from one drum passing directly to the grapple and a pulley, the rope from the other drum passing over said pulley and then to the grapple, and braking means to prevent the free unwinding of said drums.

15. In an apparatus of the character set forth, a tire opening machine, in combination with a shaft located above and at one side of the opening machine, means for driving said shaft, drums located on the shaft, a pulley located above the opening machine and at the opposite side from the shaft, an air bag engaging device, a rope passing from one of said drums to the air bag engaging device directly, and a second rope passing from another drum, over the pulley and to the grappling device.

16. In an apparatus of the character set forth, a tire opening machine, in combination with a shaft means for driving said shaft, two drums on said shaft, means for coupling either drum with the shaft, an air bag engaging device, a rope passing from one of the drums to the air bag engaging device in one direction, and a second rope passing from the other drum to the device in the other direction.

17. In an apparatus of the character set forth, a tire opening machine, in combination with a shaft, means for driving said shaft, two drums on said shaft, means for coupling either drum with the shaft, an air bag engaging device, a rope passing from one of the drums to the air bag engaging device in one direction and a second rope passing from the other drum to the device in the other direction, and friction braking means to retard unwinding of said drums.

HORACE D. STEVENS.